(12) United States Patent
Tamura et al.

(10) Patent No.: US 10,970,250 B2
(45) Date of Patent: Apr. 6, 2021

(54) SYSTEM, DATA MANAGEMENT METHOD, AND FILE SERVER

(71) Applicant: Hitachi, Ltd., Tokyo (JP)

(72) Inventors: Jun Tamura, Tokyo (JP); Naoto Ueda, Tokyo (JP); Nobuyuki Saika, Tokyo (JP)

(73) Assignee: HITACHI, LTD., Tokyo (JP)

( * ) Notice: Subject to any disclaimer, the term of this patent is extended or adjusted under 35 U.S.C. 154(b) by 196 days.

(21) Appl. No.: 16/308,518

(22) PCT Filed: Dec. 27, 2016

(86) PCT No.: PCT/JP2016/088893
§ 371 (c)(1),
(2) Date: Dec. 10, 2018

(87) PCT Pub. No.: WO2018/122961
PCT Pub. Date: Jul. 5, 2018

(65) Prior Publication Data
US 2019/0171615 A1    Jun. 6, 2019

(51) Int. Cl.
*G06F 16/11* (2019.01)
*G06F 16/178* (2019.01)
*G06F 16/185* (2019.01)
*H04L 29/08* (2006.01)
*G06F 16/17* (2019.01)
(Continued)

(52) U.S. Cl.
CPC ............ *G06F 16/113* (2019.01); *G06F 13/00* (2013.01); *G06F 16/178* (2019.01); *G06F 16/1727* (2019.01); *G06F 16/1734* (2019.01); *G06F 16/185* (2019.01); *G06F 16/1844* (2019.01);
(Continued)

(58) Field of Classification Search
CPC ..... H04L 51/18; H04L 9/32; H04L 29/06027; G06F 16/1824; G06F 16/13; G06F 16/907; G06F 11/2097; G06F 16/113
See application file for complete search history.

(56) References Cited

U.S. PATENT DOCUMENTS 8,843,459 B1* 9/2014 Aston ..................... G06F 16/13
707/694
9,871,757 B1* 1/2018 Reardon ................. H04L 51/32
(Continued)

FOREIGN PATENT DOCUMENTS

WO    2011/148496 A1    12/2011

OTHER PUBLICATIONS

International Search Report of PCT/JP2016/088893 dated Mar. 28, 2017.

*Primary Examiner* — Etienne P Leroux
(74) *Attorney, Agent, or Firm* — Mattingly & Malur, PC

(57) ABSTRACT

A system, comprising: a file server coupled to a plurality of client terminals; and an archive server coupled to the file server via a network. The file server is configured to: provide an area for storing data recognizable by each of the plurality of client terminals; determine whether to store first data into the first storage device based on an attribute of a first storage area in a case where an addition request for storing the first data into the first storage area is received from a client terminal; and transmit the addition request to the archive server. The archive server is configured to store the first data into the second storage device in a case where the addition request is received.

10 Claims, 11 Drawing Sheets

(51) Int. Cl.
*G06F 16/182* (2019.01)
*G06F 13/00* (2006.01)
(52) U.S. Cl.
CPC ...... *H04L 67/1095* (2013.01); *H04L 67/1097* (2013.01)

(56) References Cited

U.S. PATENT DOCUMENTS

| | | | |
|---|---|---|---|
| 2006/0282540 A1* | 12/2006 | Tanimoto | H04L 29/06027 709/228 |
| 2008/0229040 A1* | 9/2008 | Honma | G06F 13/385 711/162 |
| 2011/0167045 A1* | 7/2011 | Okamoto | G06F 16/1824 707/661 |
| 2012/0016838 A1 | 1/2012 | Arai et al. | |
| 2013/0339459 A1* | 12/2013 | Kumashio | H04L 51/18 709/206 |
| 2014/0040206 A1* | 2/2014 | Ramakrishnan | G06F 11/2097 707/640 |
| 2014/0143202 A1* | 5/2014 | Rekula | G06F 16/907 707/610 |
| 2016/0205079 A1* | 7/2016 | Zizzi | H04L 9/32 711/168 |

* cited by examiner

*Fig. 3*

LOG MANAGEMENT INFORMATION 225

| 301 | 302 | 303 | 304 | 305 HEADER INFORMATION | | |
|---|---|---|---|---|---|---|
| | | | | 306 | 307 | 308 |
| DATE AND TIME | ACCESS DESTINATION IP ADDRESS | REQUEST TYPE | REQUEST URL | DEVICE NAME | OS | BROWSER NAME |
| 2016/0803/12:00:00 | 201.123.145.101 | GET | http://www.AWshare.com/dir1/a.pdf | DEVICE1 | OS1 | BROWSER1 |
| 2016/0804/23:01:05 | 203.234.128.102 | GET | http://www.AWshare.com/dir1/a.pdf | DEVICE2 | OS2 | BROWSER1 |
| 2016/0805/17:02:06 | 208.120.234.56 | PUT | http://www.AWshare.com/dir1/a.pdf | DEVICE3 | OS3 | BROWSER2 |
| ... | ... | ... | ... | ... | ... | ... |

ACCESS ANALYSIS INFORMATION 226

| DIRECTORY (601) | PC ACCESS COUNT (602) | SMART DEVICE ACCESS COUNT (603) | SMART DEVICE OCCUPANCY (604) |
|---|---|---|---|
| /dir1 | 1200 | 3600 | 75% |
| /dir2 | 2500 | 2500 | 50% |
| /dir3 | 500 | 4500 | 90% |
| ⋮ | ⋮ | ⋮ | ⋮ |

*Fig. 6*

STUBBING CONDITION INFORMATION 228

| ID (701) | STUBBING CONDITION (702) | STUBBING TARGET (703) |
|---|---|---|
| 1 | FILE SYSTEM FREE CAPACITY ≦ 30% | SMART DEVICE OCCUPANCY ≤ 50% OF DIRECTORY |
| 2 | "1" IS EXECUTED AND FILE SYSTEM FREE CAPACITY ≤ 30% | SMART DEVICE OCCUPANCY ≤ 70% OF DIRECTORY |
| 3 | "1" AND "2" ARE EXECUTED AND FILE SYSTEM FREE CAPACITY ≤ 30% | SMART DEVICE OCCUPANCY ≤ 90% OF DIRECTORY |
| ⋮ | ⋮ | ⋮ |

*Fig. 7*

DEVICE CLASSIFICATION INFORMATION 229

| ID (801) | CLASSIFICATION CONDITION (802) | TYPE (803) |
|---|---|---|
| 1 | CHARACTER STRING CONTAINED IN UserAgent = {Windows, MacOS-X, Linux_x86_64, ···} | PC |
| 2 | CHARACTER STRING CONTAINED IN UserAgent = {iOS, Android, Windows Phone, ···} | SMART DEVICE |
| ⋮ | ⋮ | ⋮ |

*Fig. 8*

SYSTEM, DATA MANAGEMENT METHOD, AND FILE SERVER

BACKGROUND OF THE INVENTION

This invention relates to control of data in a system accessible by a plurality of terminals via a network.

In recent years, an on-premises system has been transitioning to a cloud system. For example, there is a service for providing a storage system by using a cloud system. In this service, a user uses a terminal of his or her company to access the storage system via a network.

There is a problem in that an access speed becomes lower in the case of a storage system that uses a cloud system. As means for solving this problem, there is known a technology described in WO 2011/148496 A1. In WO 2011/148496 A1, there is described: "A local file server, which manages a local storage device, and a remote file server, which manages a remote storage device, are connected to a communication network (for example, Internet). The local file server: (A) makes and transfers a replica of a file stored in the local storage device to the remote file server for a replication; and (B), if a first condition is satisfied, manages, as a to-be-migrated file, the file the replica of which has been transferred for the replication. Even after the completion of (B), the local file server does not delete the to-be-migrated file from the local storage device but, if a second condition is satisfied, deletes the to-be-migrated file from the local storage device."

SUMMARY OF THE INVENTION

In the technology of WO 2011/148496 A1, in principle, all the files are stored in a local file server, and a to-be-migrated file is migrated to a remote file server when a specific condition is satisfied. However, when the technology of WO 2011/148496 A1 is used, there is a problem in that a file is stored in the local file server until the specific condition is satisfied, resulting in a lack of storage capacity in the local file server and an inefficiency in utilization of the remote file server.

This invention implements management of data, which effectively utilizes an on-premises system and a cloud system, without reducing a speed of accessing a file.

The present invention can be appreciated by the description which follows in conjunction with the following figures, wherein: a system, comprises a file server coupled to a plurality of client terminals; and an archive server coupled to the file server via a network. The file server includes a first processor, a first memory coupled to the first processor, a first storage device coupled to the first processor, and a first network interface coupled to the first processor. The archive server includes a second processor, a second memory coupled to the second processor, a second storage device coupled to the second processor, and a second network interface coupled to the second processor. The first processor is configured to: provide an area for storing data recognizable by each of the plurality of client terminals; determine whether to store first data into the first storage device based on an attribute of a first storage area in a case where an addition request for storing the first data into the first storage area is received from a client terminal; and transmit the addition request to the archive server. The second processor is configured to store the first data into the second storage device in a case where the addition request is received.

According to one embodiment of this invention, data that is frequently communicated via the network is automatically stored in the local file server. With this, it is possible to reduce communication via the network and implement management of data, which effectively utilizes the on-premises system and the cloud system. Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 3 is a table for showing an example of log management information in the first embodiment;

FIG. 6 is a table for showing an example of access analysis information in the first embodiment;

FIG. 7 is a table for showing an example of stubbing condition information in the first embodiment;

FIG. 8 is a table for showing an example of device classification information in the first embodiment;

DETAILED DESCRIPTION OF THE PREFERRED EMBODIMENTS

Figure 1:
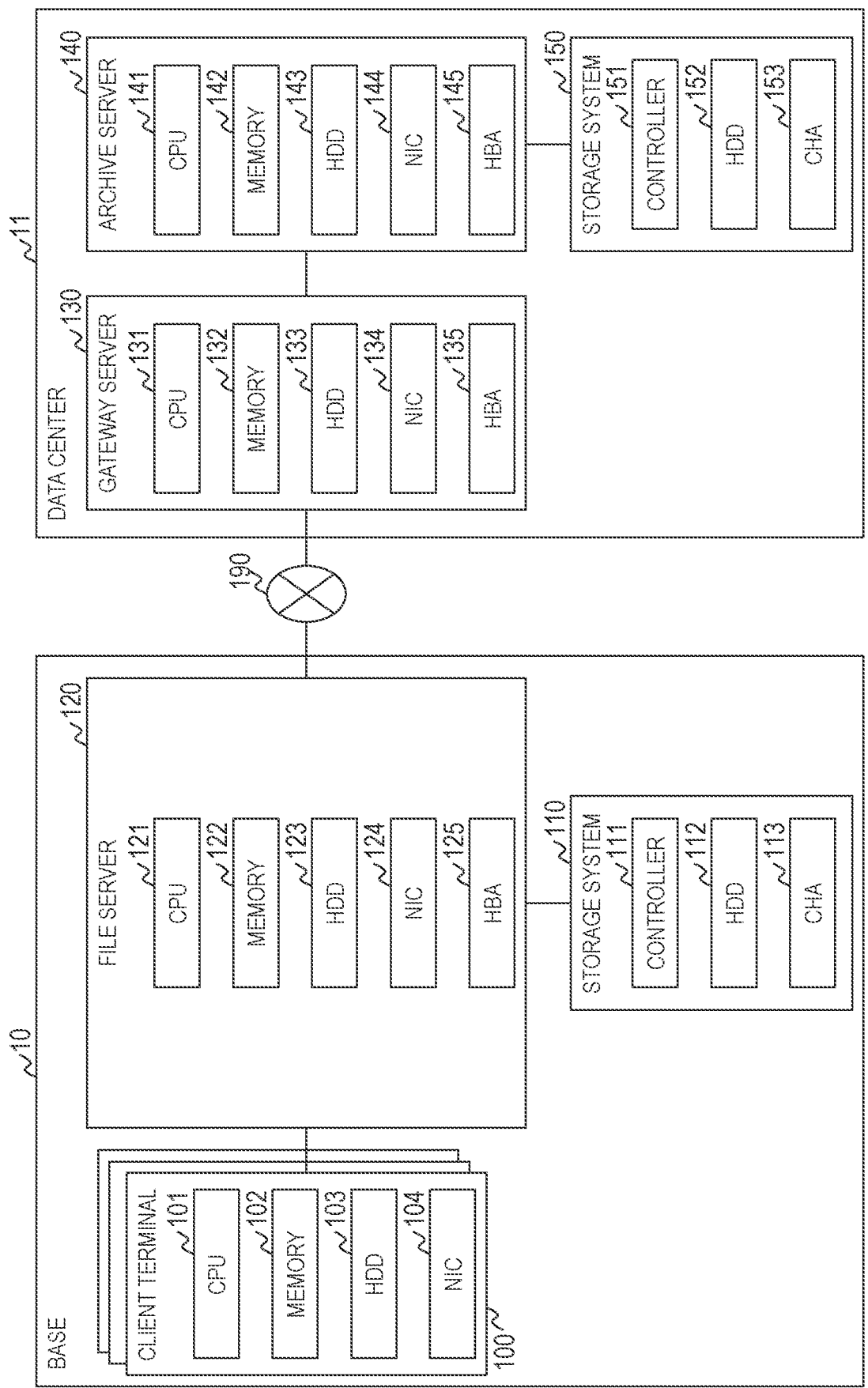
FIG. 1 is a diagram for illustrating an example of a hardware configuration of a system according to a first embodiment of this invention.

In the following description, "AAA information" indicates information that is not limited by a data structure. For example, a table format or a CSV format is conceivable as the data structure.

Further, in the following description, "AAA module" is implemented by a processor such as a central processing unit (CPU) or a graphics processing unit (GPU) operating in accordance with a program for implementing the module. All or a part of functions of the module may be implemented by hardware. Further, a plurality of functions of the module may be implemented by using separate programs.

Now, a description is given in detail of an embodiment of this invention with reference to the drawings. Components common across the drawings are denoted by the same reference numerals.

First Embodiment

Figure 2:
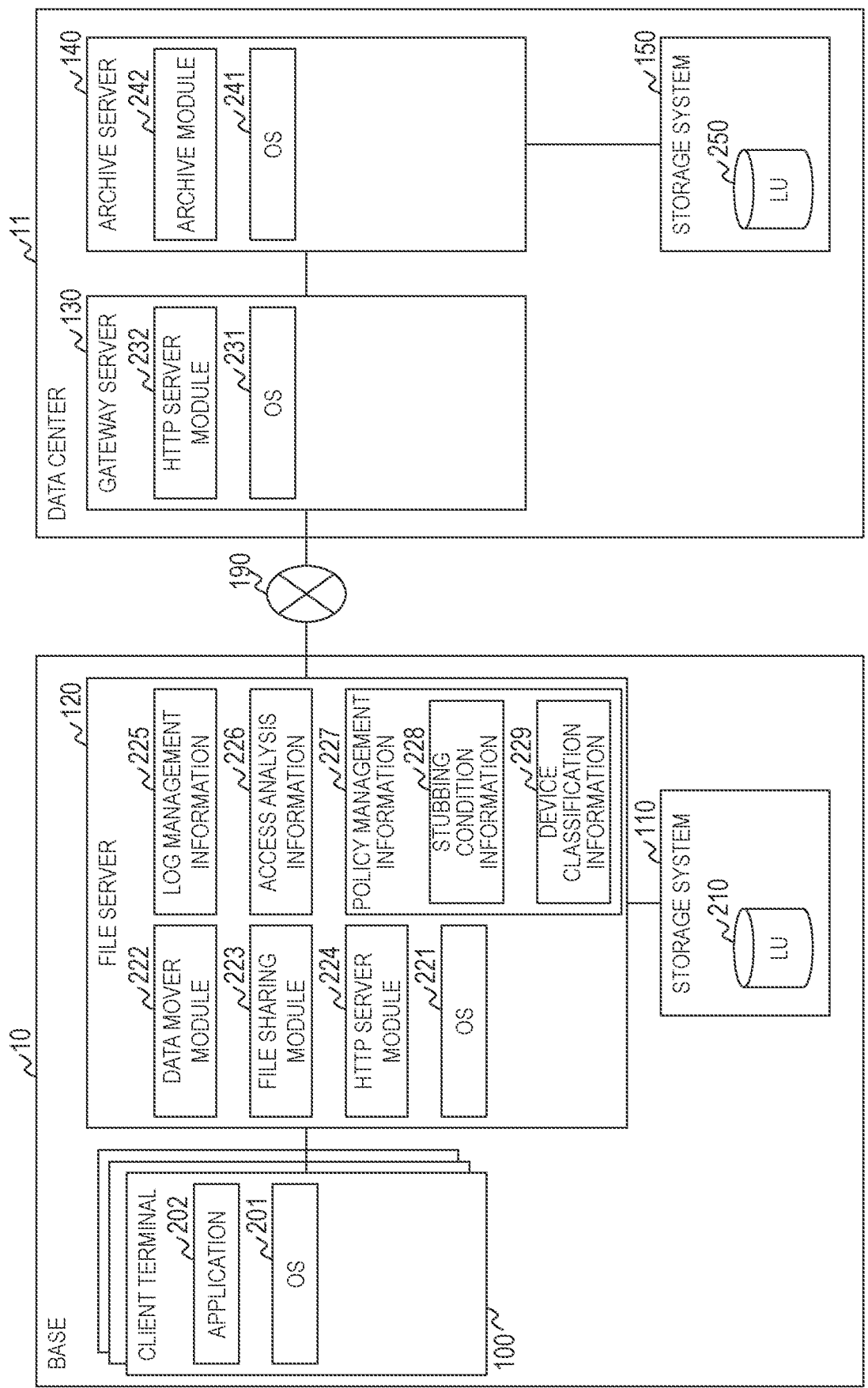
FIG. 2 is a diagram for illustrating an example of a software configuration of the system according to the first embodiment.

FIG. 1 is a diagram for illustrating an example of a hardware configuration of a system according to a first embodiment of this invention. FIG. 2 is a diagram for illustrating an example of a software configuration of the system according to the first embodiment.

The system according to the first embodiment includes a base 10 and a data center 11. The base 10 and the data center 11 are coupled to each other via a network 190. For example, a wide area network (WAN), a local area network (LAN), or the Internet is conceivable as the network 190. The first embodiment is not limited by the type of the network 190. Further, the first embodiment is not limited by a coupling method of the network 190, and wired or wireless coupling may be employed.

The base 10 is a system corresponding to an on-premises system, and includes a plurality of client terminals 100, a storage system 110, and a file server 120. The plurality of client terminals 100, the storage system 110, and the file server 120 are coupled to one another via an internal network. For example, a LAN is conceivable as the internal network. The first embodiment is not limited by the type and coupling method of the internal network.

The data center 11 is a system serving as a cloud system, and includes a gateway server 130, an archive server 140, and a storage system 150. The gateway server 130, the archive server 140, and the storage system 150 are coupled to one another via an internal network. For example, a LAN is conceivable as the internal network. The first embodiment is not limited by the type and coupling method of the internal network.

The client terminal 100 is a terminal to be used by a user. The client terminal 100 includes a central processing unit (CPU) 101, a memory 102, a hard disk drive (HDD) 103, and a network interface card (NIC) 104.

The CPU 101 is configured to execute a program stored in the memory 102. The CPU 101 operates as a module having a specific function by executing processing in accordance with a program.

The memory 102 stores a program to be executed by the CPU 101 and information to be used by the program. Further, the memory 102 includes a memory area, for example, a work area to be temporarily used.

The HDD 103 permanently stores data. The program and information to be stored in the memory 102 may be stored in the HDD 103. In this case, the CPU 101 reads the program and information from the HDD 103, loads the program and information into the memory 102, and executes the program loaded into the memory 102. The client terminal 100 may include a storage device such as a solid state drive (SSD) and a non-volatile memory instead of the HDD 103.

The NIC 104 is an interface for coupling to another device via the network.

The memory 102 stores a program for implementing an OS 201 and an application 202.

The OS 201 is configured to control the entire client terminal 100. The OS 201 includes a file system for managing a directory (folder), which is an area for storing data. The application 202 executes predetermined processing by using data stored in the storage systems 110 and 150. The first embodiment is not limited by the type and processing details of the application 202.

The base 10 in the first embodiment includes the client terminals 100 having different device types. Specifically, there are two device types of the client terminals 100, namely, a personal computer and a smart device. The smart device includes, for example, a smartphone and a tablet terminal.

The storage system 110 is a local computer that stores data to be used by the client terminal 100. The storage system 110 includes a controller 111, an HDD 112, and a channel adapter (CHA) 113. The HDD 112 is similar to the HDD 103.

The controller 111 includes a CPU and a memory (not shown), and controls the entire storage system 110. The CHA 113 is an interface for coupling to an external device, for example, the file server 120.

The memory included in the controller 111 stores a program, for example, an OS, for controlling the entire storage system 110.

The storage system 110 is configured to generate a RAID volume by using the HDD 112, and generate an LU 210 by dividing the RAID volume. The storage system 110 provides the LU 210 as a storage area to be used by the client terminal 100.

The file server 120 is a computer configured to manage data (file) to be used by the plurality of client terminals 100. The file server 120 includes a CPU 121, a memory 122, an HDD 123, an NIC 124, and a host bus adapter (HBA) 125.

The CPU 121, the memory 122, the HDD 123, and the NIC 124 are similar to the CPU 101, the memory 102, the HDD 103, and the NIC 104, respectively.

The HBA 125 is an interface for coupling to an external storage device, for example, the storage system 110.

The memory 122 stores programs for implementing an OS 221, a data mover module 222, a file sharing module 223, and an HTTP server module 224, and further stores log management information 225, access analysis information 226, and policy management information 227.

The OS 221 is similar to the OS 201.

The data mover module 222 is configured to control migration of data between the base 10 and the data center 11.

The file sharing module 223 includes a file sharing function that uses a protocol such as a common internet file system (CIFS) or a network file system (NFS). The file sharing module 223 provides a directory that can be mounted on by the client terminal 100, namely, a storage area recognizable by the client terminal 100.

The HTTP server module 224 is configured to perform communication based on a hypertext transfer protocol (HTTP).

The log management information 225 stores an access log for a file. The log management information 225 in the first embodiment is generated by the HTTP server module 224. Details of the log management information 225 are described with reference to FIG. 3.

The access analysis information 226 is information generated by analysis processing for the log management information 225, which is executed by the data mover module 222. Details of the access analysis information 226 are described with reference to FIG. 6.

The policy management information 227 stores a policy for controlling processing of stubbing data (file) stored in the base 10. The policy management information 227 is information set in advance, and can be updated appropriately. Details of the policy management information 227 are described with reference to FIG. 7. The stubbing processing is processing of deleting a main part of data from the storage device, and storing only metadata associated with information on a storage destination of the data into the storage device.

The gateway server 130 is a computer for implementing synchronization and sharing of data (file) via the network. The gateway server 130 includes a CPU 131, a memory 132, an HDD 133, an NIC 134, and an HBA 135. The CPU 131, the memory 132, the HDD 133, the NIC 134, and the HBA 135 are similar to the CPU 121, the memory 122, the HDD 123, the NIC 124, and the HBA 125, respectively.

The memory 132 stores programs for implementing an OS 231 and an HTTP server module 232. The OS 231 and the HTTP server module 232 are similar to the OS 221 and the HTTP server module 224, respectively.

The archive server 140 is a computer that stores data, and executes processing of writing/reading data to/from the storage system 150. The archive server 140 includes a CPU 141, a memory 142, an HDD 143, an NIC 144, and an HBA 145. The CPU 141, the memory 142, the HDD 143, the NIC 144, and the HBA 145 are similar to the CPU 121, the memory 122, the HDD 123, the NIC 124, and the HBA 125, respectively.

The memory 142 stores programs for implementing an OS 241 and an archive module 242. The OS 241 is similar to the OS 201.

The archive module 242 controls access to the storage system 150 based on an access request transmitted from the base 10.

The storage system 150 is a remote computer that stores data to be used by the client terminal 100. The storage system 150 includes a controller 151, an HDD 152, and a CHA 153. The controller 151, the HDD 152, and the CHA 153 are similar to the controller 111, the HDD 112, and the CHA 113, respectively.

The storage system 150 generates an LU 250 similarly to the storage system 110, and provides the LU 250 as a storage area to be used by the client terminal 100.

The data center 11 in the first embodiment includes the gateway server 130, the archive server 140, and the storage system 150 as separate devices. However, the data center 11 is only required to have an apparatus configuration that can implement the processing of writing/reading data via the network. For example, the archive server 140 may have functions of the gateway server 130 and the storage system 150.

Figure 4:
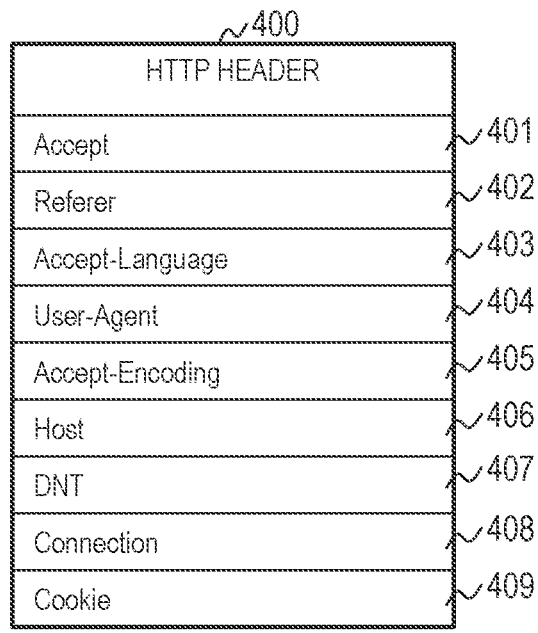
FIG. 4 is a table for showing an example of an HTTP header in the first embodiment.
Figure 5A:
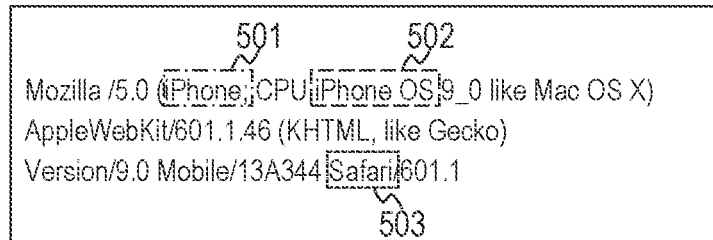
FIG. 5A, FIG. 5B, and FIG. 5C are diagrams for illustrating examples of information obtained from a User-Agent in the first embodiment.
Figure 5B:
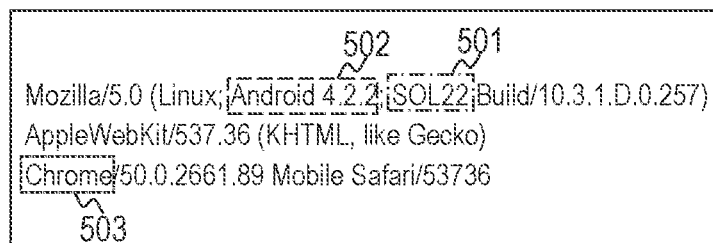
Figure 5C:
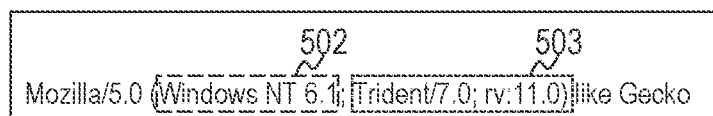

FIG. 3 is a table for showing an example of the log management information 225 in the first embodiment. FIG. 4 is a table for showing an example of an HTTP header in the first embodiment. FIG. 5A, FIG. 5B, and FIG. 5C are diagrams for illustrating examples of information obtained from a User-Agent in the first embodiment.

The log management information 225 includes an entry formed of a date and time 301, an access destination IP address 302, a request type 303, a request URL 304, and header information 305. One entry corresponds to one access log. The entry may include fields other than the above-mentioned fields.

The date and time 301 is a date and time at which the file server 120 has received an access request. The date and time 301 may store a date and time at which an access request has been issued.

The access destination IP address 302 is an IP address of an accessed device.

The request type 303 is the type of an access request. For example, the request type 303 stores the type of an HTTP method such as "PUT", "POST", or "GET".

The request URL 304 is a URL indicating a storage destination of accessed data (file). The URL includes the name of a directory storing data. For example, in the example shown in FIG. 3, the URL includes a directory name "dir1". Information indicating the storage destination of data may be information other than the URL.

The header information 305 is information obtained from an HTTP header included in an access request. The header information 305 in the first embodiment includes a field that stores a value for identifying, for example, the device type of the client terminal 100. Specifically, the header information 305 includes a device name 306, an OS 307, and a browser name 308.

The device name 306 is a device type of the client terminal 100 that has issued an access request. The OS 307 is the type of the OS 201 operating on the client terminal 100 that has issued an access request. The browser name 308 is the type of a browser used for accessing the request URL 304 by the client terminal 100 that has issued an access request.

Now, a description is given of an HTTP header with reference to FIG. 4. The HTTP header 400 includes an Accept 401, a Referer 402, an Accept-Language 403, a User-Agent 404, an Accept-Encoding 405, a Host 406, a DNT 407, a Connection 408, and a Cookie 409. The HTTP header 400 described above indicates a part of fields as an example.

The Accept 401 is a field for indicating a format of data that can be received by a browser. The Referer 402 is a field for indicating information (URL) on a page including a link used at the time of obtaining a current page. The Accept-Language 403 is a field for indicating a language that can be received by the browser. The User-Agent 404 is a field for indicating information on, for example, types of the browser and OS. The Accept-Encoding 405 is a field for indicating an encoding method that can be received by the browser. The Host 406 is a field for indicating a name of a requested server. The DNT 407 is a field for indicating whether tracking is allowed. The Connection 408 is a field for indicating a communication option for determining, for example, whether to disconnect a TCP connection after transmission of a response. The Cookie 409 is a field for indicating cookie data stored in the browser.

As illustrated in FIG. 5A, FIG. 5B, and FIG. 5C, the User-Agent 404 includes such character strings as illustrated in a frame 501, a frame 502, and a frame 503. The frame 501 is a character string indicating a device type of the client terminal 100. The frame 502 is a character string indicating a type of the OS. Further, the frame 503 is a character string indicating a type of the browser. In a case where the client terminal 100 is a personal computer, the User-Agent 404 may not include the frame 501.

In the first embodiment, a value obtained from the User-Agent 404 is stored in the header information 305.

FIG. 6 is a table for showing an example of the access analysis information 226 in the first embodiment.

The access analysis information 226 includes an entry formed of a directory 601, a PC access count 602, a smart device access count 603, and a smart device occupancy 604. One entry corresponds to one directory. The entry may include a field other than the above-mentioned fields.

The directory 601 is the name of a directory.

The PC access count 602 is the number of times personal computers have accessed data stored in a directory corresponding to the directory 601.

The smart device access count 603 is the number of times smart devices have accessed data stored in the directory corresponding to the directory 601.

The smart device occupancy 604 is a ratio of the count of access to the directory by smart devices to all the access count. Specifically, a value calculated based on Expression (1) is stored in the smart device occupancy 604.

$$(\text{smart device occupancy 604}) = \frac{(\text{smart device access count 603})}{(\text{smart device access count 603} + PC \text{ access count 602})} \quad (1)$$

FIG. 7 is a table for showing an example of stubbing condition information 228 in the first embodiment.

The stubbing condition information 228 includes an entry formed of an ID 701, a stubbing condition 702, and a stubbing target 703. One entry corresponds to one policy. The entry may include a field other than the above-mentioned fields.

The ID 701 is identification information for uniquely identifying an entry included in the stubbing condition information 228. A numerical number is set in the ID 701 in the first embodiment in order from "1".

The stubbing condition 702 is a condition for defining a timing to execute processing of stubbing data. In the first embodiment, polices are applied in order from the ID 701 of "1". Each policy may be set independently of other policies.

The stubbing target 703 is a condition for selecting data (file) serving as a target to be subjected to stubbing processing. In the first embodiment, data (file) serving as a target to be subjected to stubbing processing is selected in units of directory. Further, in the first embodiment, data (file) serving as a target to be subjected to stubbing processing is selected in accordance with the value of the smart device occupancy 604. Specifically, data (file) serving as a target to be subjected to stubbing processing is selected in order from data (file) with a lower smart device occupancy 604.

The capacity of data that can be held by a smart device is smaller than that of a personal computer, and thus data (file) is frequently accessed in the smart device. Further, data (file) stored in a directory with a larger value of the smart device occupancy 604 indicates data (file) that is frequently accessed by a smart device. Therefore, in a case where data (file) with a larger value of the smart device occupancy 604 is subjected to stubbing processing, an amount of communication via the network 190 increases. In view of the above, in the first embodiment, data (file) held by the file server 120 is selected depending on an access tendency of each device type of the client terminal 100.

FIG. 8 is a table for showing an example of device classification information 229 in the first embodiment.

The device classification information 229 includes an entry formed of an ID 801, a classification condition 802, and a type 803. One entry corresponds to one classification condition. The entry may include a field other than the above-mentioned fields.

The ID 801 is identification information for uniquely identifying an entry included in the device classification information 229. A numerical value is set in the ID 801 in the first embodiment in order from "1".

The classification condition 802 is a condition for classifying the device type of the client terminal 100. A character string included in the User-Agent 404 is set in the classification condition 802 in the first embodiment as a condition.

The type 803 is a device type of the client terminal 100 matching the classification condition 802.

Figure 9:
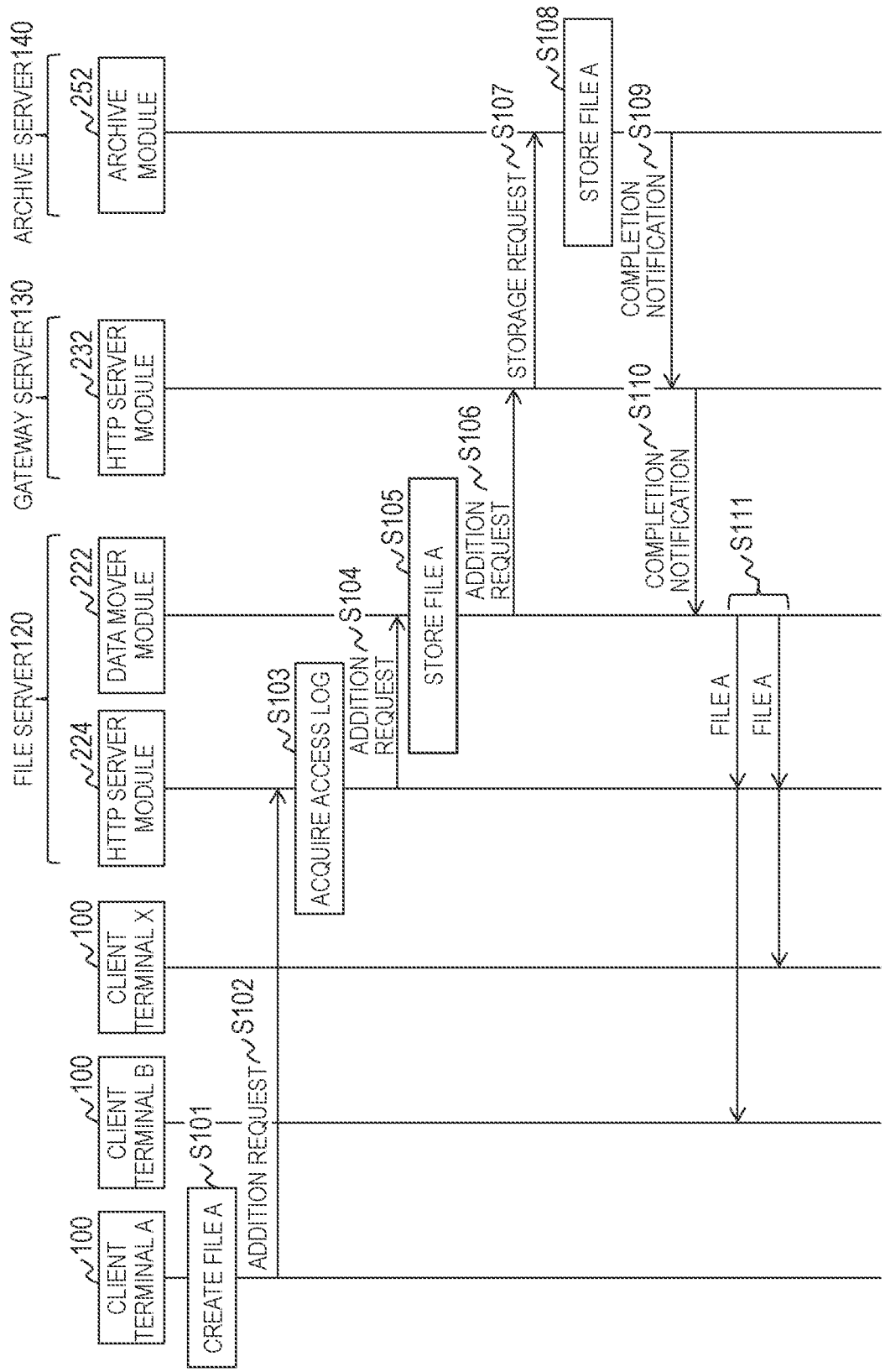
FIG. 9 is a sequence diagram for illustrating a flow of processing by the system at the time of creating a file in the first embodiment.

FIG. 9 is a sequence diagram for illustrating a flow of processing by the system at the time of creating a file in the first embodiment.

A client terminal A 100 creates a file A to be stored into a directory for group sharing (Step S101), and transmits to the file server 120 an addition request for adding the file A to the directory (Step S102). The addition request is transmitted in accordance with the HTTP, and includes the file A.

In a case where the HTTP server module 224 of the file server 120 has received the addition request, the HTTP server module 224 obtains an access log (Step S103), and registers the obtained access log in the log management information 225. Specifically, the following processing is executed.

The HTTP server module 224 adds an entry to the log management information 225, sets a date and time of reception of an addition request in the date and time 301 of the added entry, and further sets "POST" in the request type 303.

The HTTP server module 224 obtains an IP address of the access destination from an IP header, and sets the obtained IP address in the access destination IP address 302 of the added entry. Further, the HTTP server module 224 obtains a value from the User-Agent of the HTTP header, and sets the obtained value in the header information 305 of the added entry. This concludes the description of the processing of Step S103.

The HTTP server module 224 of the file server 120 transmits an addition request to the data mover module 222 (Step S104).

In a case where the data mover module 222 of the file server 120 has received the addition request, the data mover module 222 determines whether a directory for storing the file A is a directory for group sharing. In this case, the directory for storing the file A is a directory for group sharing, and thus the data mover module 222 of the file server 120 stores the file A into the storage system 110 (Step S105).

The data mover module 222 of the file server 120 transmits an addition request to the gateway server 130 (Step S106).

In a case where the HTTP server module 232 of the gateway server 130 has received the addition request, the HTTP server module 232 transmits a storage request to the archive server 140 (Step S107). The storage request includes, for example, information representing the file A and a storage destination.

In a case where the archive module 242 of the archive server 140 has received the storage request, the archive module 242 transmits a request for writing the file A to the storage system 150, to thereby store the file A into the storage system 150 (Step S108). Further, the archive module 242 of the archive server 140 transmits a completion notification of the storage request to the gateway server 130 (Step S109).

In a case where the HTTP server module 232 of the gateway server 130 has received the completion notification of the storage request, the HTTP server module 232 transmits a completion notification of the addition request to the file server 120 (Step S110).

In a case where the data mover module 222 of the file server 120 has received the completion notification of the addition request, the data mover module 222 transmits the file A to the client terminal 100 included in the group of the directory storing the file A via the HTTP server module 224 (Step S111). In the first embodiment, the file A is transmitted to a client terminal B 100 and a client terminal X 100. In this manner, in a case where data (file) is added to the directory for group sharing, the data (file) held by the file server 120 is transmitted to the client terminal 100 included in the group. Thus, it is possible to reduce the load of the network 190 due to file sharing.

Figure 12A:
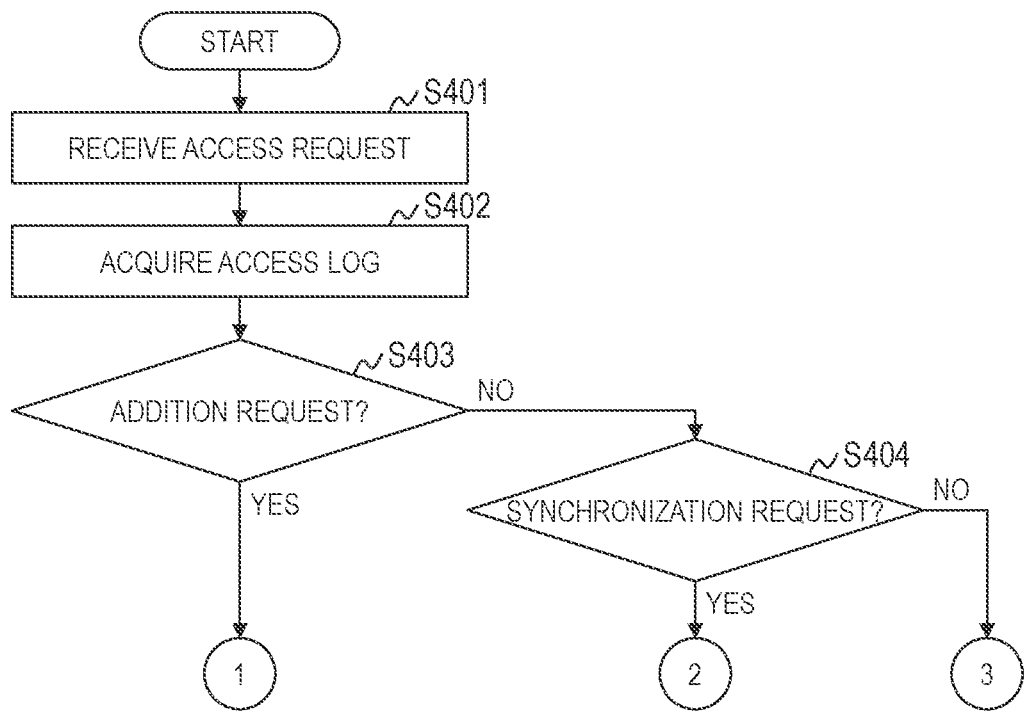
FIG. 12A, FIG. 12B, FIG. 12C, and FIG. 12D are flowcharts for illustrating an example of processing to be executed when file server in the first embodiment has received an access request.
Figure 12B:
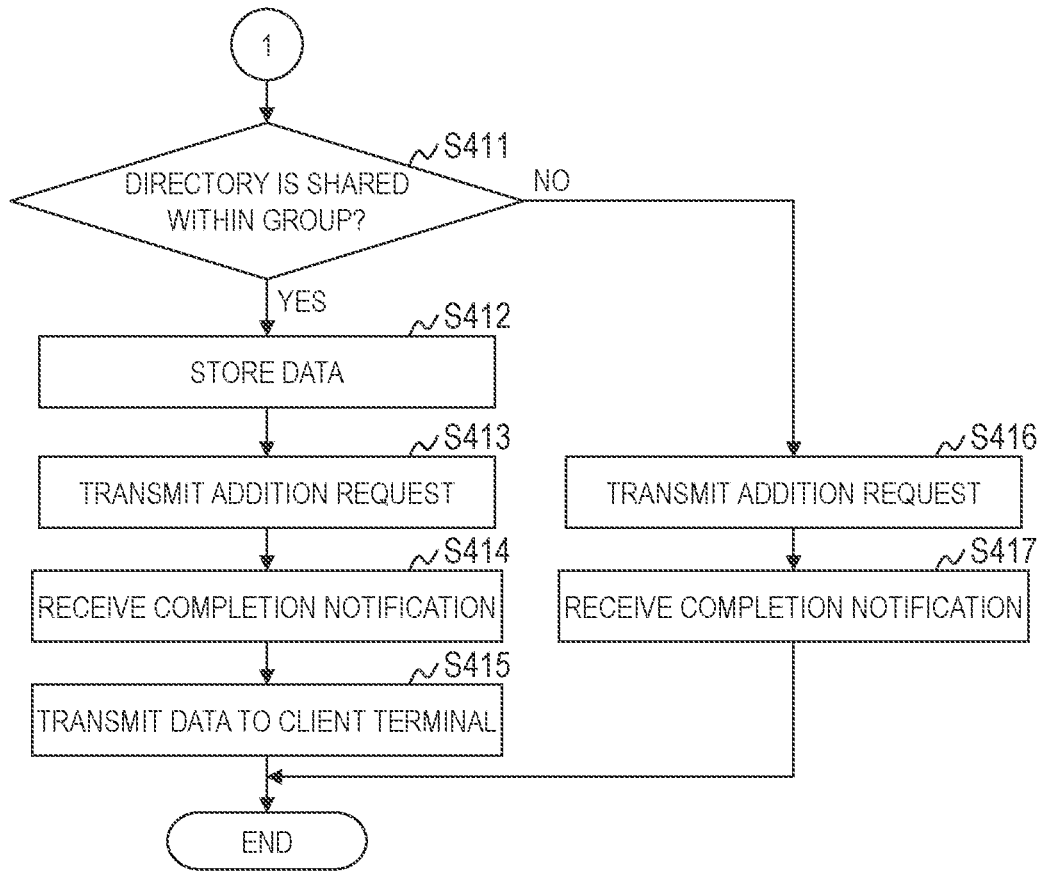

Details of the processing in the case of the file server 120 receiving an addition request are described with reference to FIG. 12A and FIG. 12B.

Figure 10:
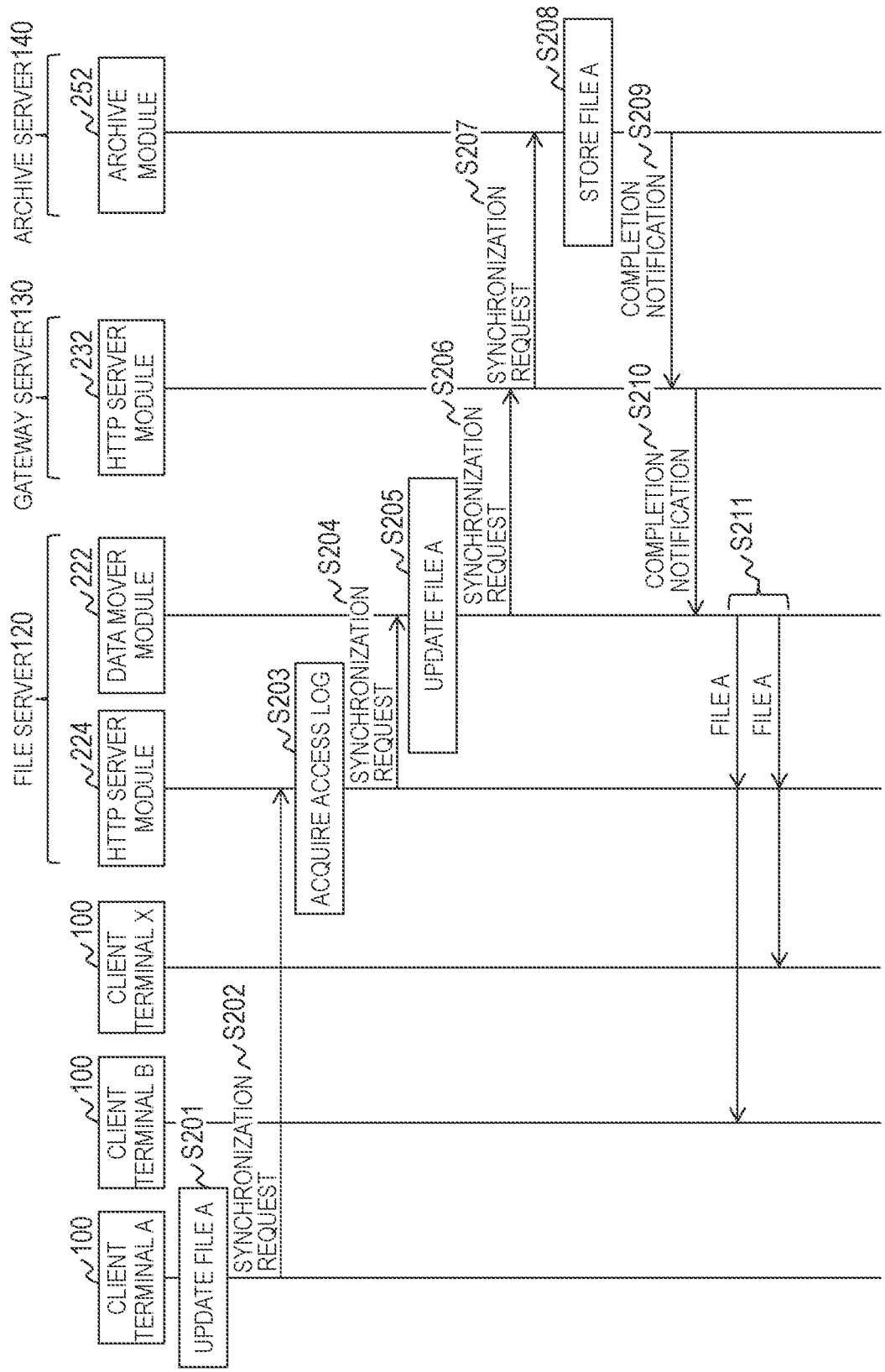
FIG. 10 is a sequence diagram for illustrating a flow of processing by the system at a time when a file is updated in the first embodiment.

FIG. 10 is a sequence diagram for illustrating a flow of processing by the system at a time when a file is updated in the first embodiment.

The client terminal A 100 updates the file A stored in the directory for group sharing (Step S201). Specifically, the client terminal A 100 updates the file A stored in the HDD 103. The client terminal A 100 transmits a synchronization request to the file server 120 (Step S202). The synchronization request is transmitted in accordance with the HTTP, and further includes the updated file A.

In a case where the HTTP server module 224 of the file server 120 has received the synchronization request, the HTTP server module 224 obtains an access log (Step S203). The processing of Step S203 is similar to that of Step S103, and thus a description thereof is omitted here. "PUT" is set in the request type 303.

The HTTP server module 224 of the file server 120 transmits a synchronization request to the data mover module 222 (Step S204).

In a case where the data mover module 222 of the file server 120 has received the synchronization request, the data mover module 222 determines whether the file A is stored in the storage system 110. In this case, it is assumed that the file A is stored in the storage system 110. Therefore, the data mover module 222 of the file server 120 updates the file A stored in the storage system 110 (Step S205).

The data mover module 222 of the file server 120 transmits a synchronization request to the gateway server 130 (Step S206).

In a case where the HTTP server module 232 of the gateway server 130 has received the synchronization request, the HTTP server module 232 transmits a synchronization request to the archive server 140 (Step S207).

In a case where the archive module 242 of the archive server 140 has received the synchronization request, the archive module 242 transmits a request for writing the updated file A to the storage system 150, to thereby store the updated file A into the storage system 150 (Step S208). Further, the archive module 242 of the archive server 140 transmits a completion notification of the synchronization request to the gateway server 130 (Step S209).

In a case where the HTTP server module 232 of the gateway server 130 has received the completion notification of the synchronization request, the HTTP server module 232 transmits a completion notification of the synchronization request to the file server 120 (Step S210).

In a case where the data mover module 222 of the file server 120 has received the completion notification of the synchronization request, the data mover module 222 transmits the file A to the client terminal 100 included in the group of the directory storing the file A via the HTTP server module 224 (Step S211). In the first embodiment, the updated file A is transmitted to the client terminal B 100 and the client terminal X 100.

Figure 12C:
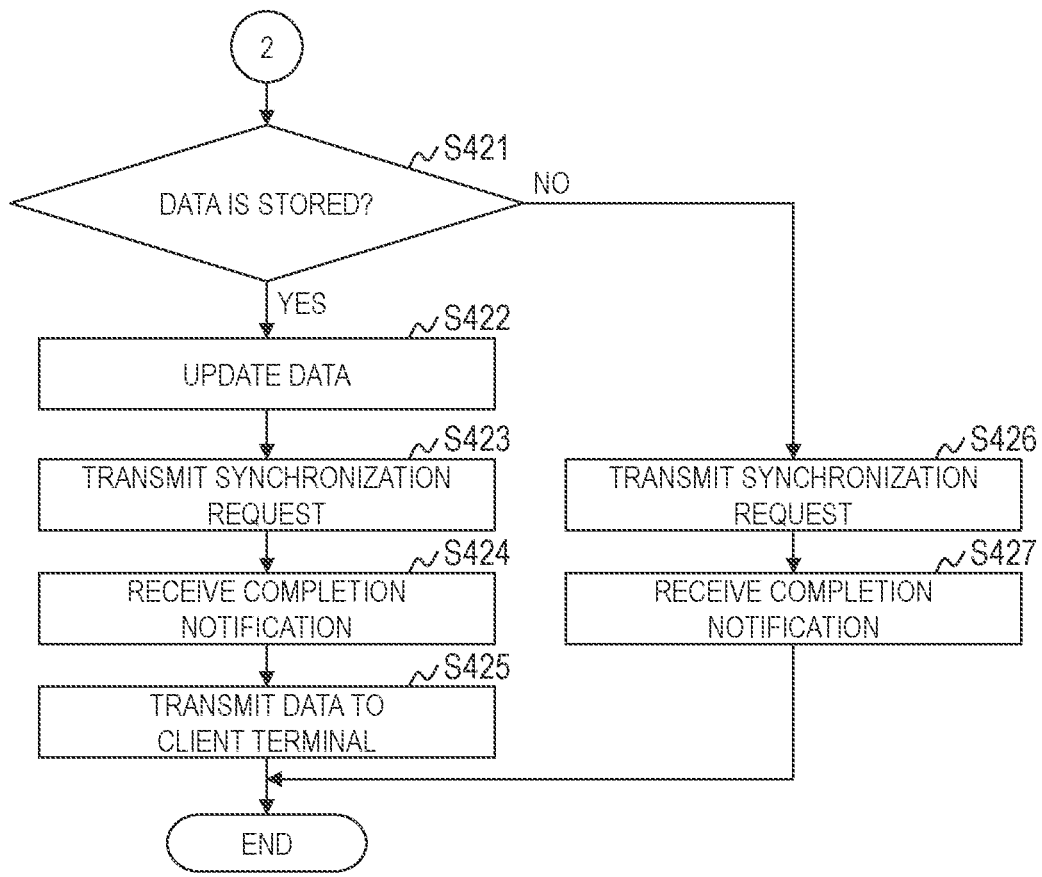
Figure 12D:
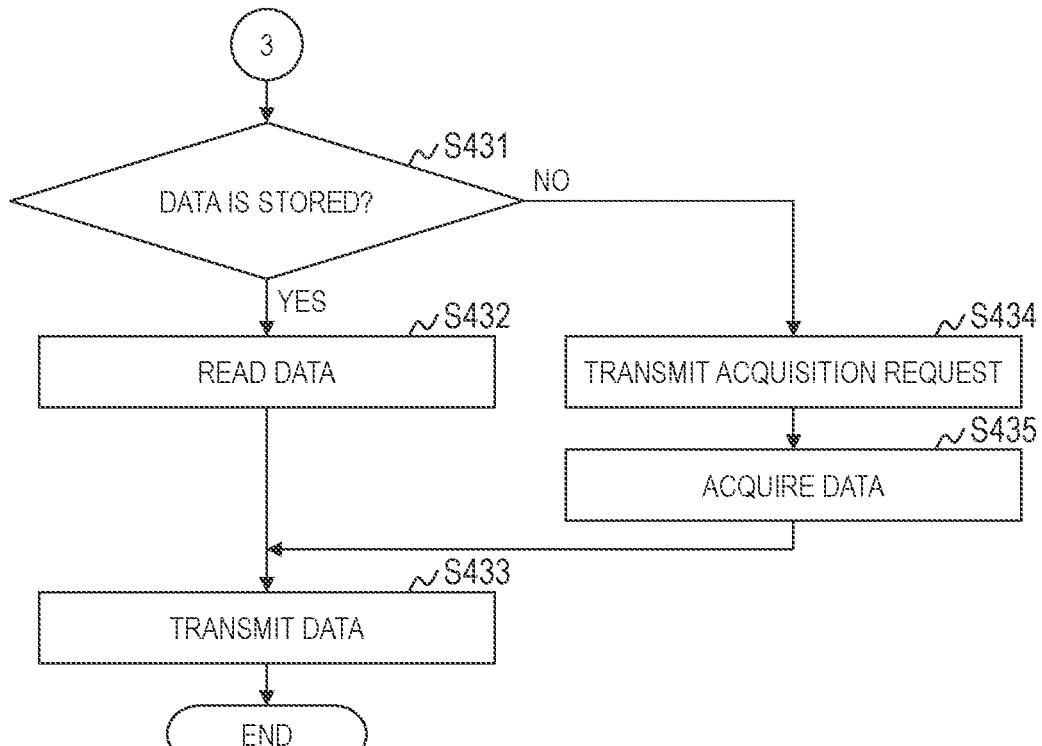

Details of the processing in the case of the file server 120 receiving a synchronization request are described with reference to FIG. 12A and FIG. 12C.

Figure 11:
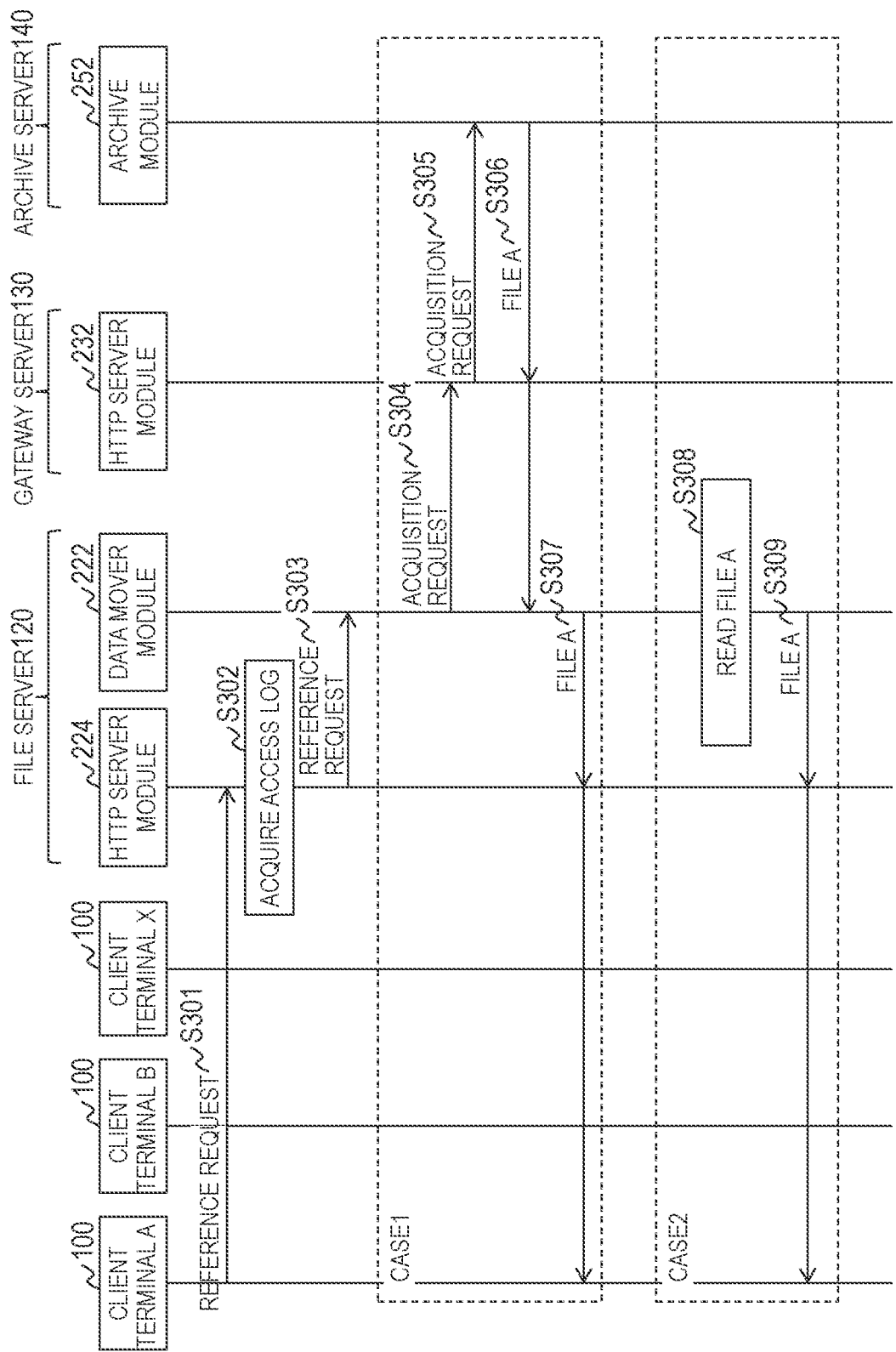
FIG. 11 is a sequence diagram for illustrating a flow of processing by the system at a time when a file is referred to in the first embodiment.

FIG. 11 is a sequence diagram for illustrating a flow of processing by the system at a time when a file is referred to in the first embodiment.

The client terminal A 100 transmits to the file server 120 a reference request for referring to the file A (Step S301). The reference request is transmitted in accordance with the HTTP, and includes, for example, a URL indicating the storage destination of the file A.

In a case where the HTTP server module 224 of the file server 120 has received the reference request, the HTTP server module 224 obtains an access log (Step S302). The processing of Step S302 is similar to that of Step S103, and thus a description thereof is omitted here. "GET" is set in the request type 303.

The HTTP server module 224 of the file server 120 transmits a reference request to the data mover module 222 (Step S303).

In a case where the data mover module 222 of the file server 120 has received the reference request, the data mover module 222 determines whether the file A is stored in the storage system 110. Processing of any one of (Case 1) and (Case 2) is executed depending on the result of determination.

(Case 1)

In a case where the storage system 110 does not store the file A, the data mover module 222 of the file server 120 transmits an obtaining request for obtaining the file A to the gateway server 130 (Step S304). In a case where the HTTP server module 232 of the gateway server 130 has received the obtaining request, the HTTP server module 232 transmits the obtaining request to the archive server 140 (Step S305). The archive module 242 of the archive server 140 obtains the file A from the storage system 150, and transmits the obtained file A to the file server 120 via the gateway server 130 (Step S306). In a case where the data mover module 222 of the file server 120 has received the file A, the data mover module 222 transmits the file A to the client terminal A 100 via the HTTP server module 224 (Step S307).

(Case 2)

In a case where the storage system 110 stores the file A, the data mover module 222 of the file server 120 reads the file A from the storage system 110 (Step S308). The data mover module 222 of the file server 120 transmits the file A to the client terminal A 100 via the HTTP server module 224 (Step S309).

FIG. 12A, FIG. 12B, FIG. 12C, and FIG. 12D are flowcharts for illustrating an example of processing to be executed when the file server 120 in the first embodiment has received an access request.

In a case where the file server 120 has received an access request from the client terminal 100 (Step S401), the file server 120 obtains an access log from the access request (Step S402).

Specifically, the HTTP server module 224 adds an access log corresponding to the access request to the log management information 225. Specific processing has been described in Step S103, and thus a description thereof is omitted here.

Next, the file server 120 determines whether the access request is an addition request (Step S403).

Specifically, the HTTP server module 224 determines the type of the access request, and then calls the data mover module 222. At this time, the HTTP server module 224 inputs the type of the access request into the data mover module 222. As a result, the data mover module 222 can determine the type of the access request.

In a case where it is determined that the access request is an addition request, the file server 120 determines whether the directory for storing data (file) is a directory for group sharing (Step S411).

Specifically, the data mover module 222 refers to definition information on the directory, and determines whether the directory for storing the data (file) is a directory for group sharing. The definition information on the directory is information managed by any one of the file sharing module 223 and the OS 221, and includes information on, for example, a right of access to the directory.

In a case where it is determined that the directory for storing the data (file) is a directory for group sharing, the file server 120 stores the data (file) into the storage system 110 (Step S412), and transmits an addition request to the gateway server 130 (Step S413).

Specifically, the data mover module 222 transmits a request for storing the data (file) to the storage system 110, and further transmits an addition request to the gateway server 130.

The file server 120 receives a completion notification of the addition request from the gateway server 130 (Step S414), and then transmits the added data (file) to the client terminal 100 included in the group of the directory storing the data (file) (Step S415). After that, the file server 120 ends the processing.

In Step S411, in a case where it is determined that the directory storing the data (file) is not a directory for group sharing, the file server 120 transmits an addition request to the gateway server 130 (Step S416), and further receives a completion notification of the addition request from the gateway server 130 (Step S417). After that, the file server 120 ends the processing.

In Step S403, in a case where it is determined that the access request is not an addition request, the file server 120 determines whether the access request is a synchronization request (Step S404).

In a case where it is determined that the access request is a synchronization request, the file server 120 determines whether data (file) to be updated is stored in the storage system 110 (Step S421).

For example, the data mover module 222 performs determination of Step S421 by making an inquiry to the storage system 110. Further, in a case where the data mover module 222 holds link information on the data (file) stored in the storage system 110, the data mover module 222 performs determination of Step S421 based on the link information.

When only metadata of the data (file) is stored, the data mover module 222 determines that the data (file) to be updated is stored in the storage system 110.

In a case where it is determined that the data (file) to be updated is stored in the storage system 110, the file server 120 updates the data (file) stored in the storage system 110 (Step S422), and transmits a synchronization request to the gateway server 130 (Step S423).

Specifically, the data mover module 222 transmits a request for writing the data (file) to the storage system 110. When only the metadata on the data (file) is stored, the metadata and data itself are stored in the storage system 110.

In a case where the file server 120 receives a completion notification of a synchronization request from the gateway server 130 (Step S424), the file server 120 transmits the updated data (file) stored in the storage system 110 to the client terminal 100 included in the group of the directory storing the data (file) (Step S425). After that, the file server 120 ends the processing.

In Step S421, in a case where it is determined that the data (file) to be updated is not stored in the storage system 110, the file server 120 transmits a synchronization request to the gateway server 130 (Step S426), and receives a completion notification of the synchronization request from the gateway server 130 (Step S427). After that, the file server 120 ends the processing.

In Step S404, in a case where it is determined that the access request is a reference request, the file server 120 determines whether data (file) to be read is stored in the storage system 110 (Step S431). The processing of Step S431 is similar to the processing of Step S421. However, when only the metadata of the data (file) is stored, the data mover module 222 determines that the data (file) to be read is not stored in the storage system 110.

In a case where it is determined that the data (file) to be read is stored in the storage system 110, the file server 120 reads the data (file) from the storage system 110 (Step S432), and then proceeds to Step S433.

In a case where it is determined that the data (file) to be read is not stored in the storage system 110, the file server 120 transmits to the gateway server 130 an obtaining request for obtaining the data (file) to be read (Step S434), and obtains the data (file) to be read from the gateway server 130 (Step S435). After that, the file server 120 proceeds to Step S433.

After the processing of Step S432 or Step S435 is complete, the file server 120 transmits the data (file) to be read to the client terminal 100 (Step S433).

Figure 13:
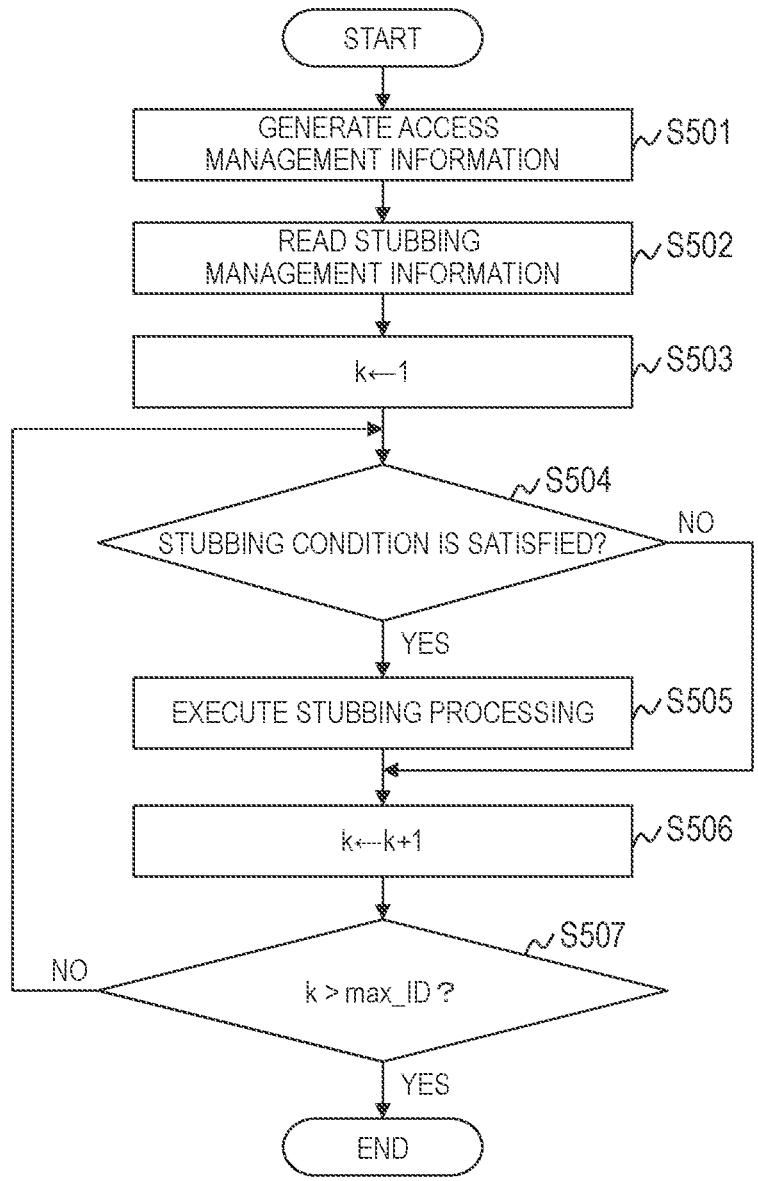
FIG. 13 is a flowchart for illustrating an example of stubbing processing to be executed by the file server in the first embodiment.

FIG. 13 is a flowchart for illustrating an example of the stubbing processing to be executed by the file server 120 in the first embodiment.

The data mover module 222 of the file server 120 periodically executes the stubbing processing. The first embodiment is not limited by a timing to execute the stubbing processing. For example, in a case where an access request is received or data is stored in the storage system 110, the data mover module 222 may execute the stubbing processing.

The data mover module 222 uses the log management information 225 and the device classification information 229 to generate the access analysis information 226 (Step S501). Specifically, the following processing is executed.

(Procedure 1)

The data mover module 222 initializes the access analysis information 226.

(Procedure 2)

The data mover module 222 refers to each entry of the log management information 225, and identifies a directory to be accessed. The data mover module 222 adds to the access analysis information 226 as many entries as the number of identified directories, and sets the names of those identified directories in the directories 601 of the added entries.

(Procedure 3)

The data mover module 222 selects a target directory from among the identified directories. The data mover module 222 refers to a request URL of the log management information 225, and obtains an access log (entry) whose directory to be accessed is the target entry.

(Procedure 4)

The data mover module 222 calculates an access count for each device type based on the header information 305 and the device classification information 229 of the obtained entry. The data mover module 222 sets the calculated access count in the PC access count 602 and the smart device access count 603 of an entry corresponding to the target directory of the access analysis information 226. Further, the data mover module 222 sets the value calculated based on Expression (1) in the smart device occupancy 604 of the entry corresponding to the target directory.

The data mover module 222 executes the processing of (Procedure 3) and (Procedure 4) for all the identified directories. This concludes the description of the processing of Step S501.

Next, the data mover module 222 reads the stubbing condition information 228 (Step S502), and further sets an initial value "1" in a variable k (Step S503).

The data mover module 222 determines whether the stubbing condition 702 is satisfied for an entry in which the ID 701 matches the variable k (Step S504).

In a case where it is determined that the stubbing condition 702 is not satisfied for the entry in which the ID 701 matches the variable k, the data mover module 222 proceeds to Step S506. In the first embodiment, in a case where the stubbing condition 702 is not satisfied, the processing of determining the stubbing condition is not required to be performed for an entry in which the ID 701 is larger than the variable k. Therefore, in a case where the result of determination in Step S504 is "NO", the data mover module 222 may end the processing.

In a case where it is determined that the stubbing condition 702 is satisfied for the entry in which the ID 701 matches the variable k, the data mover module 222 executes the stubbing processing based on the stubbing target 703 of that entry (Step S505). After that, the data mover module 222 proceeds to Step S506. Specifically, the following processing is executed.

The data mover module 222 identifies the target entry of the stubbing processing based on the access analysis information 226 and the stubbing target 703. For example, in the case of an entry in which the ID 701 is "1", a directory "/dir2" is identified as the target directory of the stubbing processing.

The data mover module 222 deletes data other than the metadata in the file stored in the target directory of the stubbing processing. This concludes the description of the processing of Step S505.

In a case where the result of determination in Step S504 is "NO" or after the processing of Step S505 is complete, the data mover module 222 sets a value obtained by adding "1" to the variable k as the new variable k (Step S506).

The data mover module 222 determines whether the variable k is larger than a threshold value max_ID (Step S507). In other words, it is determined whether the processing is complete for all the entries of the stubbing condition information 228. The threshold value max_ID is the number of entries registered in the stubbing condition information 228.

In a case where it is determined that the variable k is equal to or smaller than the threshold value max_ID, the data mover module 222 returns to Step S504 and executes similar processing.

In a case where it is determined that the variable k is larger than the threshold value max_ID, the data mover module 222 ends the processing.

As described above, the file server 120 automatically copies the data (file) stored in the directory for group sharing into the storage system 110. With this, only the required data (file) is stored in the local storage system 110, and thus it is possible to solve the lack of capacity in the storage system 110, and to effectively utilize the remote storage system 150. Further, it is possible to reduce the amount of communication via the network due to file sharing.

Further, the file server 120 identifies the data (file) to be subjected to the stubbing processing based on the device type of the client terminal 100 accessing the directory. With this, it is possible to suppress deterioration in performance of accessing data and to solve the lack of capacity in the storage system 110 due to the increase in data amount.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A system, comprising:
   a file server coupled to a plurality of client terminals; and
   an archive server coupled to the file server via a network,
   the file server including:
   a first processor;
   a first memory coupled to the first processor;
   a first storage device coupled to the first processor; and
   a first network interface coupled to the first processor,
   the archive server including:
   a second processor;
   a second memory coupled to the second processor;
   a second storage device coupled to the second processor; and
   a second network interface coupled to the second processor, the first processor being configured to:
provide an area for storing data recognizable by each of the plurality of client terminals;
determine whether to store first data into the first storage device based on an attribute of a first storage area in a case where an addition request for storing the first data into the first storage area is received from a client terminal; and
transmit the addition request to the archive server,
the second processor being configured to store the first data into the second storage device in a case where the addition request is received,
wherein the first processor is configured to:
determine whether the first storage area is shared by the plurality of client terminals;
store the first data into the first storage device in a case where the first storage area is determined to be shared by the plurality of client terminals; and
transmit the first data stored in the first storage device to a plurality of client terminals other than the client terminal that has transmitted the addition request,
wherein the first memory is configured to store log management information, for managing an access request received from the client terminal as an access log, and policy management information for storing a policy for controlling stubbing processing to delete data other than metadata of the data stored in the first storage device,
wherein the policy management information stores a policy including a first condition indicating a timing to execute the stubbing processing and a second condition indicating a criterion for selecting data to be subjected to the stubbing processing, and
wherein the first processor is configured to:
analyze an access request in a case where the access request is received from the client terminal, to thereby identify a type of the client terminal;
store the access log including the type of the client terminal into the log management information;
analyze the log management information to generate access analysis information indicating an access tendency of each type of a client terminal for each data storage area;
determine whether the first condition is satisfied by referring to the policy management information;
identify data matching the second condition from among pieces of data stored in the first storage device by referring to the access analysis information in a case where the first condition is determined to be satisfied; and
execute the stubbing processing for the identified data.

2. The system according to claim 1, wherein the first processor is configured to:
determine satisfaction of the first condition in a case where a free space of the first storage device is smaller than a first threshold value; and
identify data, which is stored in a storage area of the first storage device for which a value indicating an access tendency of a client terminal of a first type is larger than a threshold value, as data matching the second condition.

3. The system according to claim 2,
wherein the first processor is configured to:
determine whether the first data is stored in the first storage device in a case where a synchronization request for updating the first data is received from the client terminal;
update the first data in a case where the first data is determined to be stored in the first storage device;
transmit the synchronization request to the archive server;
transmit the updated first data to a plurality of client terminals other than the client terminal that has transmitted the synchronization request, and
wherein the second processor is configured to update the first data stored in the second storage device in a case where the synchronization request is received.

4. The system according to claim 2, wherein the first processor is configured to:
determine whether the first data is stored in the first storage device in a case where a reference request for referring to the first data is received from the client terminal;
transmit the first data stored in the first storage device to the client terminal that has transmitted the reference request in a case where the first data is determined to be stored in the first storage device; and
obtain the first data by transmitting the reference request to the archive server, and transmit the obtained first data to the client terminal that has transmitted the reference request in a case where the first data is determined to be not stored in the first storage device.

5. A data management method to be executed in a system, the system including:
a file server coupled to a plurality of client terminals; and
an archive server coupled to the file server via a network,
the file server including:
a first processor;
a first memory coupled to the first processor;
a first storage device coupled to the first processor; and
a first network interface coupled to the first processor,
the archive server including:
a second processor;
a second memory coupled to the second processor;
a second storage device coupled to the second processor; and
a second network interface coupled to the second processor,
the data management method including:
a first step of providing, by the first processor, an area for storing data recognizable by each of the plurality of client terminals;
a second step of determining, by the first processor, whether to store first data into the first storage device based on an attribute of a first storage area in a case where an addition request for storing the first data into the first storage area is received from a client terminal;
a third step of transmitting, by the first processor, the addition request to the archive server; and
a fourth step of storing, by the second processor, the first data into the second storage device in a case where the addition request is received,
wherein the second step includes:
a step of determining, by the first processor, whether the first storage area is shared by the plurality of client terminals; and
a step of storing, by the first processor, the first data into the first storage device in a case where the first storage area is determined to be shared by the plurality of client terminals,
wherein the fourth step includes a step of transmitting, by the first processor, the first data stored in the first storage device to a plurality of client terminals other than the client terminal that has transmitted the addition request, wherein the first memory is configured to store log management information, for managing an access request received from the client terminal as an access log, and policy management information for storing a policy for controlling stubbing processing to delete data other than metadata of the data stored in the first storage device, wherein the policy management information stores a policy including a first condition indicating a timing to execute the stubbing processing and a second condition indicating a criterion for selecting data to be subjected to the stubbing processing, and wherein the data management method further includes:

a fifth step of analyzing, by the first processor, an access request in a case where the access request is received from the client terminal, to thereby identify a type of the client terminal;

a sixth step of storing, by the first processor, the access log including the type of the client terminal into the log management information;

a seventh step of analyzing, by the first processor, the log management information to generate access analysis information indicating an access tendency of each type of a client terminal for each data storage area;

an eighth step of determining, by the first processor, whether the first condition is satisfied by referring to the policy management information;

a ninth step of identifying, by the first processor, data matching the second condition from among pieces of data stored in the first storage device by referring to the access analysis information in a case where the first condition is determined to be satisfied; and a tenth step of executing, by the first processor, the stubbing processing for the identified data.

6. The system according to claim 5, wherein the eighth step includes a step of determining, by the first processor, satisfaction of the first condition in a case where a free space of the first storage device is smaller than a first threshold value, and wherein the tenth step includes a step of identifying, by the first processor, data, which is stored in a storage area of the first storage device for which a value indicating an access tendency of a client terminal of a first type is larger than a threshold value, as data matching the second condition.

7. The data management method according to claim 6, further including:

a step of determining, by the first processor, whether the first data is stored in the first storage device in a case where a synchronization request for updating the first data is received from the client terminal;

a step of updating, by the first processor, the first data in a case where the first data is determined to be stored in the first storage device;

a step of transmitting, by the first processor, the synchronization request to the archive server;

a step of transmitting, by the first processor, the updated first data to a plurality of client terminals other than the client terminal that has transmitted the synchronization request; and a step of updating, by the second processor, the first data stored in the second storage device in a case where the synchronization request is received.

8. The data management method according to claim 6, further including:

a step of determining, by the first processor, whether the first data is stored in the first storage device in a case where a reference request for referring to the first data is received from the client terminal;

a step of transmitting, by the first processor, the first data stored in the first storage device to the client terminal that has transmitted the reference request in a case where the first data is determined to be stored in the first storage device; and a step of obtaining, by the first processor, the first data by transmitting the reference request to the archive server in a case where the first data is determined to be not stored in the first storage device, and transmitting the obtained first data to the client terminal that has transmitted the reference request.

9. A file server, which is configured to receive an access request transmitted from a plurality of client terminals, and is coupled to an archive server storing data to be accessed via a network, the file server comprising:

a processor;

a memory coupled to the processor;

a storage device coupled to the processor; and a network interface coupled to the processor, the processor being configured to:

provide an area for storing data recognizable by each of the plurality of client terminals;

determine whether a first storage area is shared by the plurality of client terminals in a case where an addition request for storing first data into the first storage area is received from a client terminal;

store the first data into the first storage device in a case where the first storage area is determined to be shared by the plurality of client terminals;

transmit the addition request to the archive server; and transmit the first data stored in the storage device to a plurality of client terminals other than the client terminal that has transmitted the addition request, wherein the memory is configured to store log management information for managing an access request received from the client terminal as an access log, and wherein the processor is configured to:

analyze an access request to thereby identify a type of the client terminal in a case where the access request is received from the client terminal;

store the access log including the type of the client terminal into the log management information;

analyze the log management information to generate access analysis information indicating an access tendency of each type of a client terminal for each data storage area;

determine whether a free space of the storage device is smaller than a first threshold value;

identify data stored in a storage area for which a value indicating an access tendency of a client terminal of a first type is larger than a threshold value, from among pieces of data stored in the storage device by referring to the access analysis information, in a case where the free space of the storage device is determined to be smaller than the first threshold value; and execute stubbing processing to delete data other than metadata for the identified data.

10. The file server according to claim 9, wherein the processor is configured to:

determine whether the first data is stored in the storage device in a case where a synchronization request for updating the first data is received from the client terminal;

update the first data in a case where the first data is determined to be stored in the storage device;
transmit the synchronization request to the archive server; and
transmit the updated first data to a plurality of client terminals other than the client terminal that has transmitted the synchronization request.

\* \* \* \* \*